United States Patent
Rost (10) Patent No.: US 10,396,932 B2
(45) Date of Patent: Aug. 27, 2019

(54) METHOD FOR OPERATING A MOBILE COMMUNICATION NETWORK

(71) Applicant: NEC EUROPE LTD., Heidelberg (DE)

(72) Inventor: Peter Rost, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 18 days.

(21) Appl. No.: 15/550,372

(22) PCT Filed: Feb. 13, 2015

(86) PCT No.: PCT/EP2015/053076
§ 371 (c)(1),
(2) Date: Aug. 11, 2017

(87) PCT Pub. No.: WO2016/128064
PCT Pub. Date: Aug. 18, 2016

(65) Prior Publication Data
US 2018/0034580 A1    Feb. 1, 2018

(51) Int. Cl.
H04L 1/00    (2006.01)
H04L 1/20    (2006.01)
H04L 1/16    (2006.01)
H04L 29/08   (2006.01)

(52) U.S. Cl.
CPC .......... *H04L 1/0009* (2013.01); *H04L 1/0003* (2013.01); *H04L 1/0018* (2013.01); *H04L 1/0051* (2013.01); *H04L 1/0058* (2013.01); *H04L 1/20* (2013.01); *H04L 1/1671* (2013.01); *H04L 69/323* (2013.01); *Y02D 50/10* (2018.01)

(58) Field of Classification Search
None
See application file for complete search history.

(56) References Cited

U.S. PATENT DOCUMENTS

| | | |
|---|---|---|
| 2002/0054578 A1 | 5/2002 | Zhang et al. |
| 2003/0125066 A1 | 7/2003 | Habetha |
| 2004/0093458 A1 | 5/2004 | Kanno et al. |
| 2006/0128318 A1 | 6/2006 | Agarossi et al. |

(Continued)

FOREIGN PATENT DOCUMENTS

JP    2006211017 A    8/2006

OTHER PUBLICATIONS

Rost Peter et al: "Opportunistic Hybrid ARQ-Enabler of Centralized-RAN Over Nonideal Back", IEEE Wireless Communications Letters, IEEE, Piscataway, NJ, USA, vol. 3, No. 5, Oct. 1, 2014 (Oct. 1, 2014), pp. 481-484, XP011561162.

Jens Bartelt: "Definition of PHY layer approaches that are applicable to RANaaS and a holistic design of backhaul and access network", INFSO-ICT-317941 iJOIN, Deliverable 2.2, Oct. 31, 2014 (Oct. 31, 2014), XP055217635.

(Continued)

*Primary Examiner* — Diane L Lo
(74) *Attorney, Agent, or Firm* — Leydig, Voit & Mayer, Ltd.

(57) ABSTRACT

A method for operating a mobile communication network includes identifying link processing jobs running on one or more entities in the mobile communication network which cause an increase of data transmission delay in a communication link between the radio access network and a core network of the mobile communication network. One or more of the identified link processing jobs is selected. Link parameters of the selected link processing jobs of the communication link are adapted depending on latency requirements of a service using the communication link.

21 Claims, 5 Drawing Sheets

(56) References Cited

U.S. PATENT DOCUMENTS

| | | | |
|---|---|---|---|
| 2007/0291671 | A1 | 12/2007 | Yoshii |
| 2009/0080557 | A1 | 3/2009 | Wilhelmsson et al. |
| 2010/0162070 | A1 | 6/2010 | Das et al. |
| 2011/0158333 | A1 | 6/2011 | Nakano et al. |
| 2012/0092991 | A1* | 4/2012 | Jeong ................ H04L 47/25 370/235 |
| 2013/0079011 | A1* | 3/2013 | Duda ................ H04L 47/122 455/436 |
| 2013/0286868 | A1* | 10/2013 | Oyman ............... H04W 24/06 370/252 |
| 2014/0185496 | A1* | 7/2014 | Wolf ................ H04W 92/20 370/294 |
| 2015/0009836 | A1* | 1/2015 | Tujkovic ............ H04L 1/0026 370/252 |
| 2016/0344517 | A1* | 11/2016 | Bergstrom ........... H04L 1/1678 |

OTHER PUBLICATIONS

3GPP TS 23.203 V10.8.0 (Sep. 2012); $3^{rd}$ Generation Partnership Project; Technical Specification Group Services and System Aspects; Policy and charging control architecture (Release 10), Sep. 2012, pp. 1-131.

3GPP TS 36.300 V12.4.0 (Dec. 2014); $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12), Dec. 2014, pp. 1-251.

3GPP TS 36.201 V12.1.0 (Dec. 2014); $3^{rd}$ Generation Partnership Project; Technical Specification Group Radio Access Network; Evolved Universal Terrestrial Radio Access (E-UTRA); LTE physical layer; General description (Release 12), Dec. 2014, pp. 1-13.

* cited by examiner

METHOD FOR OPERATING A MOBILE COMMUNICATION NETWORK

CROSS-REFERENCE TO PRIOR APPLICATION

This application is a U.S. National Stage Application under 35 U.S.C. § 371 of International Application No. PCT/EP2015/053076 filed on Feb. 13, 2015. The International Application was published in English on Aug. 18, 2016 as WO 2016/128064 A1 under PCT Article 21(2).

STATEMENT REGARDING FUNDING

The work leading to this invention has received funding from the European Union's Seventh Framework Program (FP 7/2007-2013) under grant agreement No. 317 941.

FIELD

The present invention relates to a method for operating a mobile communication network.

The present invention further relates to a mobile communication network, comprising a radio access network and a core network.

BACKGROUND

Figure 1:
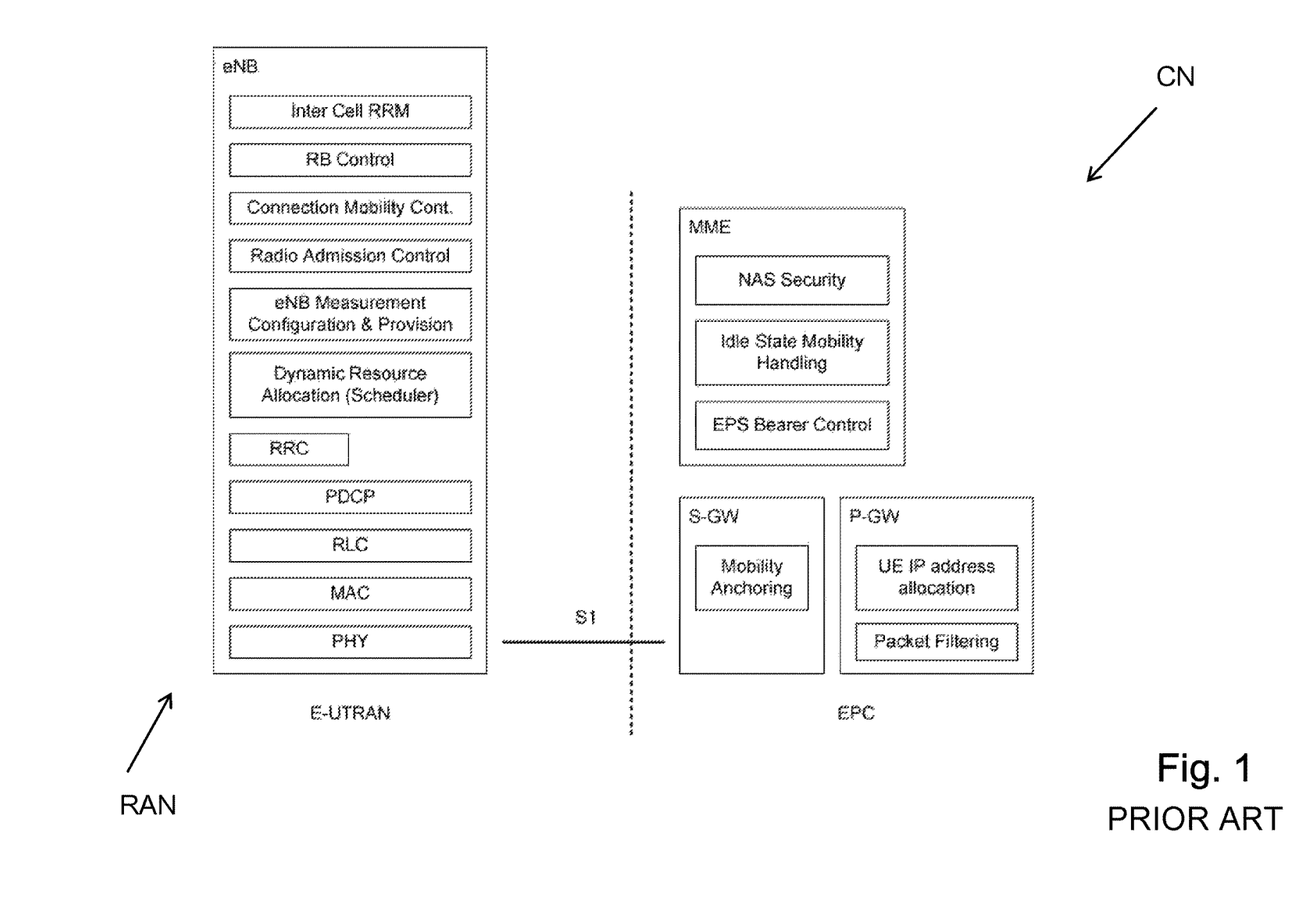
FIG. 1 shows a conventional mobile communication network.
Figure 2:
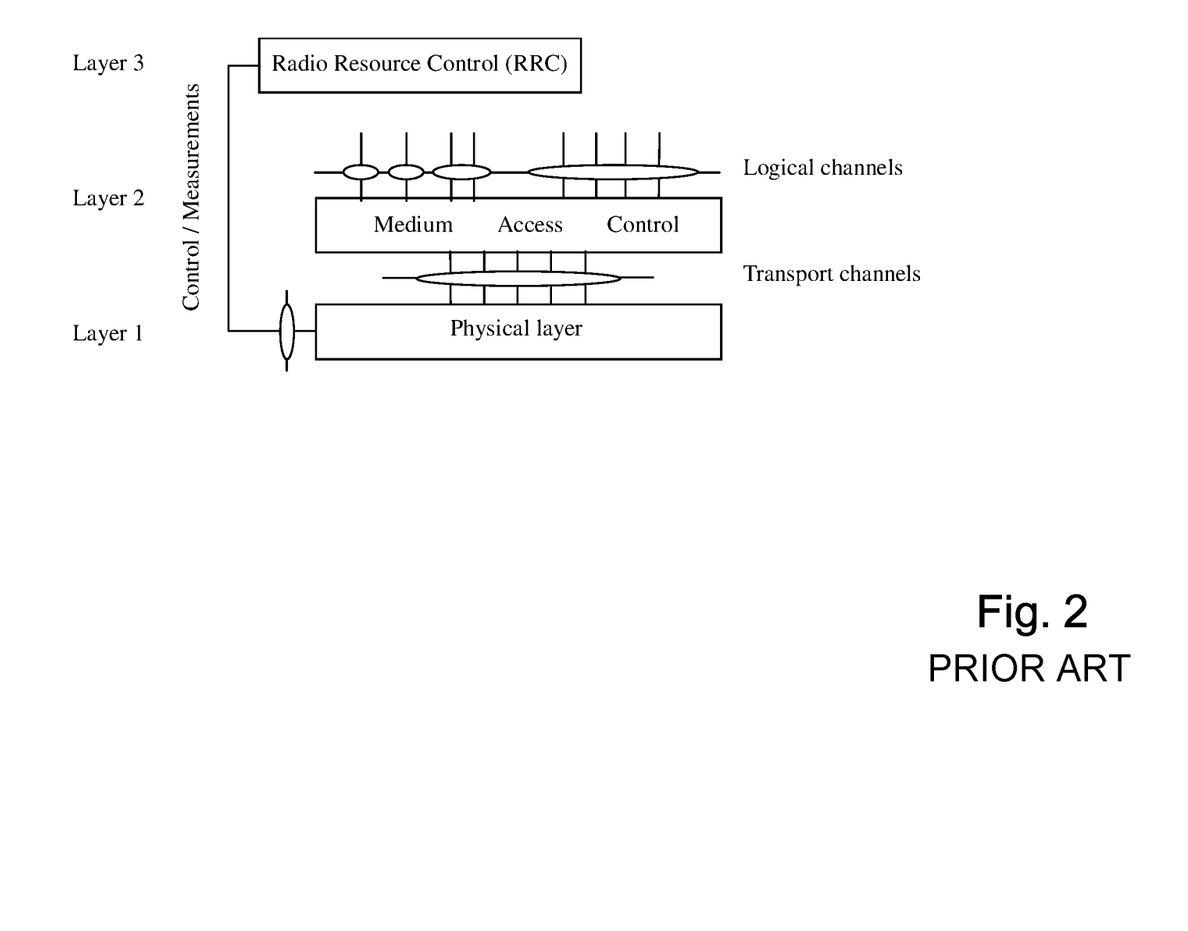
FIG. 2 shows part of a conventional mobile communication network in more detail.

In FIG. 1, a conventional non-centralized radio access network in form of an E-UTRAN according to 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), 3GPP LTE is shown. The evolved nodeB eNB performs all radio access network RAN related functionality. Therefore the functionality is usually executed decentralized at a local radio access point. This includes preferably the corresponding layer 1-3 functionality according to 3rd Generation Partnership Project; Technical Specification Group Radio Access Network; Evolved Universal Terrestrial Radio Access (E-UTRA); LTE physical layer; General description (Release 10) as shown in FIG. 2 where a radio resource control RRC controls and performs measurements on the physical layer. As shown in FIG. 1 the core network CN functionality is usually performed on a centralized entity or entities.

Current developments for radio access networks RAN are going to be more centralized than today's conventional radio access networks, at least partly. That means that radio access points like base stations or evolved node Bs eNBs only perform part of the radio access network protocol stack while the main part is performed centrally. A remote radio access point therefore for example performs part of the layer 1-3 of the radio access network functionality while the remaining functionality is performed at a centralized entity. This centralized entity may be a virtual base station pool executed on top of cloud-computing platforms. Examples for such an architecture include Centralized RAN, disclosed in the non-patent-literature of "C-RAN The Road Towards Green RAN," white paper v2.5, October 2011, CMCC, or the "RAN as a Service" concept as discussed in P. Rost, C. J. Bernardos, A. De Domenico, M. Di Girolamo, M. Lalam, A. Maeder, D. Sabella, and D. Wübben, "Cloud technologies for flexible 5G radio access networks," IEEE Communications Magazine, vol. 52, no. 5, May 2014, respectively.

Mobile radio access networks are usually subject to quality of service QoS constraints which are in particular expressed by packet delay, packet loss probability and throughput constraints. For example in 3GPP LTE, i.e. according to 3GPP Technical Specification 23.203, 'Policy and charging control architecture (Release 8)', www.3gpp.org, these constraints are reflected by the bearer concept introducing QCI, i.e. a quality of service QoS class of identifier. For example the general term "packet delay" comprises different parts all contributing to the delay such as air interface latency, radio access network processing latency, core network latency and latency imposed by the actual service processing used by a user terminal UE. When looking on the radio access network processing latency, this latency is imposed by encoding and decoding processes caused by forward error correction. In a conventional LTE network the encoding and decoding processes are performed by a so-called turbo-encoder/decoder or in case of a IEEE 802.16m, i.e. a WIMAX radio access network, by a so-called low density parity check LDPC code for which a message-passing decoder can be employed. This processing latency may become dominant in the radio access network if the encoding and/or decoding processing is performed on non-specialized hardware such as general purpose processes or entities like deployed in cloud-computing environments.

In US 2004/0093458, a method for controlling turbo-decoding time in a high-speed packet data communication system is described. In more detail, the decoding time of a turbo-decoder is controlled depending on the completion status of a previous transmission and a hybrid automatic repeat request HARQ status.

SUMMARY

In an embodiment, the present invention provides a method for operating a mobile communication network. Link processing jobs running on one or more entities in the mobile communication network which cause an increase of data transmission delay are identified, preferably packet delay, in a communication link between the radio access network and a core network of the mobile communication network. One or more of the identified link processing jobs is selected, preferably those causing the largest deterioration in the delay. Link parameters of the selected link processing jobs of the communication link are adapted depending on latency requirements of a service using the communication link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Although applicable in general to any kind of mobile communication network, the present invention will be described with regard to a partly centralized radio access network of a mobile communication network.

Although applicable in general to any kind of delay, the present invention will be described with regard to a packet delay caused by encoding and decoding processes.

The inventor has recognized that one of the disadvantages is that decoding constraints may not be kept and therefore the decoding success may be affected negatively. The inventor has also recognized a further disadvantage is that the decoding time is controlled based on a completion status of a previous transmission therefore lacking flexibility and actuality.

An aspect of the present invention provides a method for operating a mobile communication network and a mobile communication network which proactively controls the delay in particular caused by link processing.

Another aspect of the present invention provides a method for operating a mobile communication network and a mobile communication network which keeps latency constraints without affecting the success of link processing.

According to an embodiment, a method for operating a mobile communication network comprises:
a) link processing jobs running on one or more entities in the mobile communication network which cause an increase of data transmission delay are identified, preferably packet delay, in a communication link between the radio access network and a core network of said mobile communication network,
b) one or more of the identified link processing jobs are selected, preferably those causing the largest deterioration in said delay, and
c) link parameters of the selected link processing jobs of the communication link are adapted depending on latency requirements of a service using said communication link.

In claim 14 a mobile communication network comprising a radio access network and a core network, preferably for performing with a method according to one of the claims 1-13, is defined.

According to another embodiment, a mobile communication network comprising a radio access network and a core network, preferably for performing with a method according to an embodiment of the present invention, comprises: an identifying entity adapted to identify link processing jobs running on one or more entities in the mobile communication network which cause an increase of data transmission delay, preferably packet delay, in a communication link between said radio access network and said core network, a selecting entity adapted to select one or more of the identified link processing jobs, preferably those causing the largest deterioration in said delay, and an adaption entity adapted to modify link parameters of the selected link processing jobs of the communication link depending on latency requirements of a service using said communication link.

According to the invention it has been recognized that a processing latency of a radio access network can be controlled by adapting link parameters of selected links processing jobs of a communication link.

According to the invention it has been further recognized that an easy implementation of a radio access network on general purpose entities or devices is enabled while satisfying constraints or real-time guarantees.

According to the invention it has been further recognized that a delay is proactively controlled based on actual services that is delivered on the communication link.

The term "entity" is to be understood in its broadest sense. An entity may for example be a plurality of devices connected with each other to perform a certain function or functions. In particular with regard to claim 1 link processing jobs may run in parallel on different entities or may be parallelized or the like.

The term "link processing job" is to be understood in a sense that it relates to processing jobs performed on entities responsible for establishing a communication link or affecting the delay in data transmission via that communication link.

The term "modulation-and-coding scheme" denotes a matching of a modulation, coding and other signal and protocol parameters to the conditions on the radio communication link, for example path loss, interference due to signals coming from other transmitters, a sensitivity of the receiver, available transmission power, etc. and is particular to be understood in the aforementioned sense. For example in the enhanced data service for a GSM evolution (EDGE) the modulation-and-coding scheme determines how many bits per second are transmitted in one time slot and uses a rate adaption algorithm adapting the modulation-and-coding scheme according to the quality of the radio channel in the radio communication link. Different modulation procedures can be used. Usually a so-called lower modulation-and-coding scheme uses the "lowest" data transmission rate whereas the "highest" modulation-and-coding scheme has the highest data transmission rate per time slot. For example, when the quality of the communication link deteriorates then a base station of the radio access network can change to a lower modulation-and-coding scheme.

According to a preferred embodiment, a selected link processing job is a decoding and/or encoding process of an applied forward error correction code on said communication link. The encoding and decoding process has a significant impact on the radio access network processing latency and therefore on the data transmission delay.

According to a further preferred embodiment, in step c) the link parameters being adapted include a signal-to-noise power ratio, wherein said ratio is adapted by using a higher or a lower transmission power of entities between which the communication link is established. This enables in an easy way to increase the transmission power to compensate a higher noise leading to packet loss on the communication link for example.

According to a further preferred embodiment, in step c) the link parameters being adapted include parameters representing a modulation-and-coding scheme and wherein the parameters of said modulation-and-coding scheme are adapted such that said scheme is reduced if an encoding and/or decoding time exceeds a encoding and/or decoding latency constraint and increased if said encoding and/or decoding time falls below said encoding and/or decoding latency constraint. This enables in an easy way to adapt the parameters of a modulation-and-coding scheme for reducing the data transmission delay on the communication link.

According to a further preferred embodiment, additional resources, preferably in form of physical resource blocks, are allocated if available or freed for the communication link according to an adaption of the modulation-and-coding scheme. This enables in a flexible way to allocate or free additional resources for example to outweigh a rate-loss due to the adjustment of the modulation-and-coding scheme.

According to a further preferred embodiment, said data transmission delay imposed by a backhaul connection between a remote access point in the radio access network and an entity in the core network is determined and included in the latency requirements of said service. This enables a more precise adaption of the link parameters. For example when a delay imposed by the backhaul connection between a remote access point and a central processor if the delay is significant compared to the required latency guarantees then this delay is subtracted from the required latency constraint to obtain an optimal adaption of the link parameters.

According to a further preferred embodiment, for representing a performance of the decoding and/or encoding process a single parameter is used. Then the decoding performance or the encoding performance can be characterized by one parameter or value enabling an easy comparison and evaluation of the complete decoding process and/or encoding process by other entities. The performance of the decoding and/or encoding process can for example be represented by the single parameter representing the decoding time per iteration and information bit.

According to a further preferred embodiment, depending a) on a decoding time constraint indicating a maximum allowable decoding time for a turbo-decoder and/or b) on an encoding time constraint indicating a maximum allowable encoding time for a turbo-encoder and parameters of a modulation-and-coding scheme a maximum number of iterations for the turbo-decoder and/or turbo-encoder is provided. The terms "turbo-encoder" and "turbo-decoder" are technical terms in 3GPP LTE. For example depending on the decoding time constraint and a given modulation-and-coding scheme in the case of a turbo-decoder a maximum number of turbo-decoder iterations is provided in order to maintain the decoding time and preferably to provide a feedback in time.

According to a further preferred embodiment, feedback information of the decoding and/or encoding process is evaluated by comparing said feedback information with a decoding time constraint and/or encoding time constraint and a change indication for the modulation-and-coding scheme to a user terminal is provided in case said constraint is not met. This enables in an easy way to control the decoding and/or encoding delay such that before encoding/ decoding is performed, for example a non-acknowledgement message NACK is sent in order to indicate that a lower modulation-and-coding scheme has to be chosen.

According to a further preferred embodiment, when user terminals choose modulation-and-coding schemes then user terminal information and service-dependent link adaption information is provided to each user terminal. For example a base station may provide user terminal and service-dependent link adaption tables to each user terminal enabling a precise adaption of the link parameters by a user terminal.

According to a further preferred embodiment, a monitoring module is provided such that it is self-learnable and that it regularly, preferably permanently, monitors the selected link processing jobs, preferably in form of a decoding process and/or encoding process and evaluates the monitoring information, preferably in form of actual decoding time and/or encoding time and adjusts the link parameters of step c) automatically based on the evaluated monitoring information. This allows in a fast and efficient way to adapt link parameters of the selected link processing jobs.

The term "self-learnable" is to be meant that the monitoring module evaluates provided information and aggregates the evaluated information for further refining the adaption of parameters of links. For example the monitoring module may be implemented with a neural network or the like.

According to a further preferred embodiment, an entity on which link processing jobs are running is provided in form of a base station and/or a user terminal in the radio access network. This allows an easy implementation of the method in current mobile communication networks.

According to a further preferred embodiment, relation information, preferably in form of a link adaption table, is maintained reflecting link parameters of selected link processing jobs and service requirements, preferably wherein the service requirements include a latency requirement and a signal-to-interference-plus-noise ratio of conditions of the communication link. This enables an easy access to the information relating the chosen link-adaptation to both service-requirement in terms of latency and said signal-to-interference-plus-noise ratio, i.e. the actual modification of the link-adaptation, for example the signal-to-noise power ratio offset or the modulation-and-coding scheme depending on a user's experienced instantaneous channel conditions.

FIG. 1 shows a conventional mobile communication network.

In FIG. 1, the difference between E-UTRAN and EPC according to 3GPP 36.300 is shown. An evolved nodeB eNB in a radio access network RAN is connected via a Si connection to a core network CN of the mobile communication network in form of an evolved packet core EPC in LTE terminology.

FIG. 2 shows part of a conventional mobile communication network in more detail.

In FIG. 2, layers 1-3 according to 3GPP 36.201 of LTE is shown. Logical channels are provided in layer 2 whereas transport channels are provided in layer 1. A radio resource control RRC performs control and measurements on layer 3.

Figure 3:
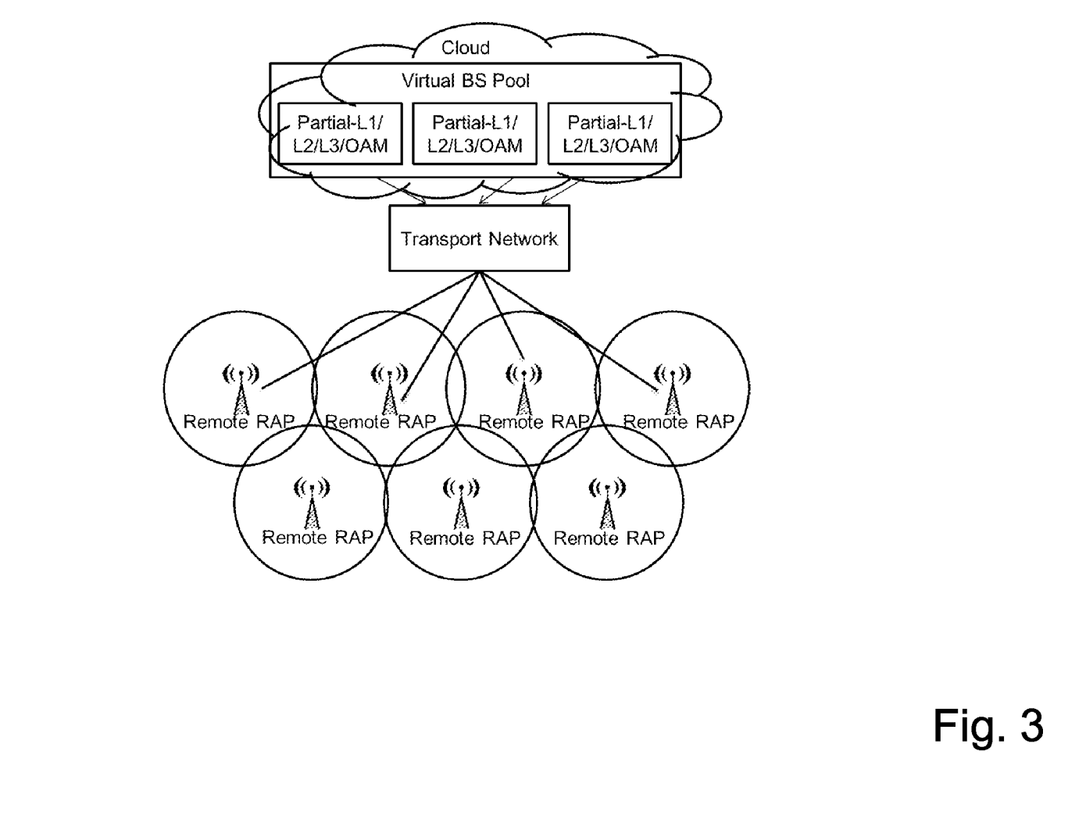
FIG. 3 shows part of a mobile communication network according to a first embodiment of the present invention.
Figure 4:
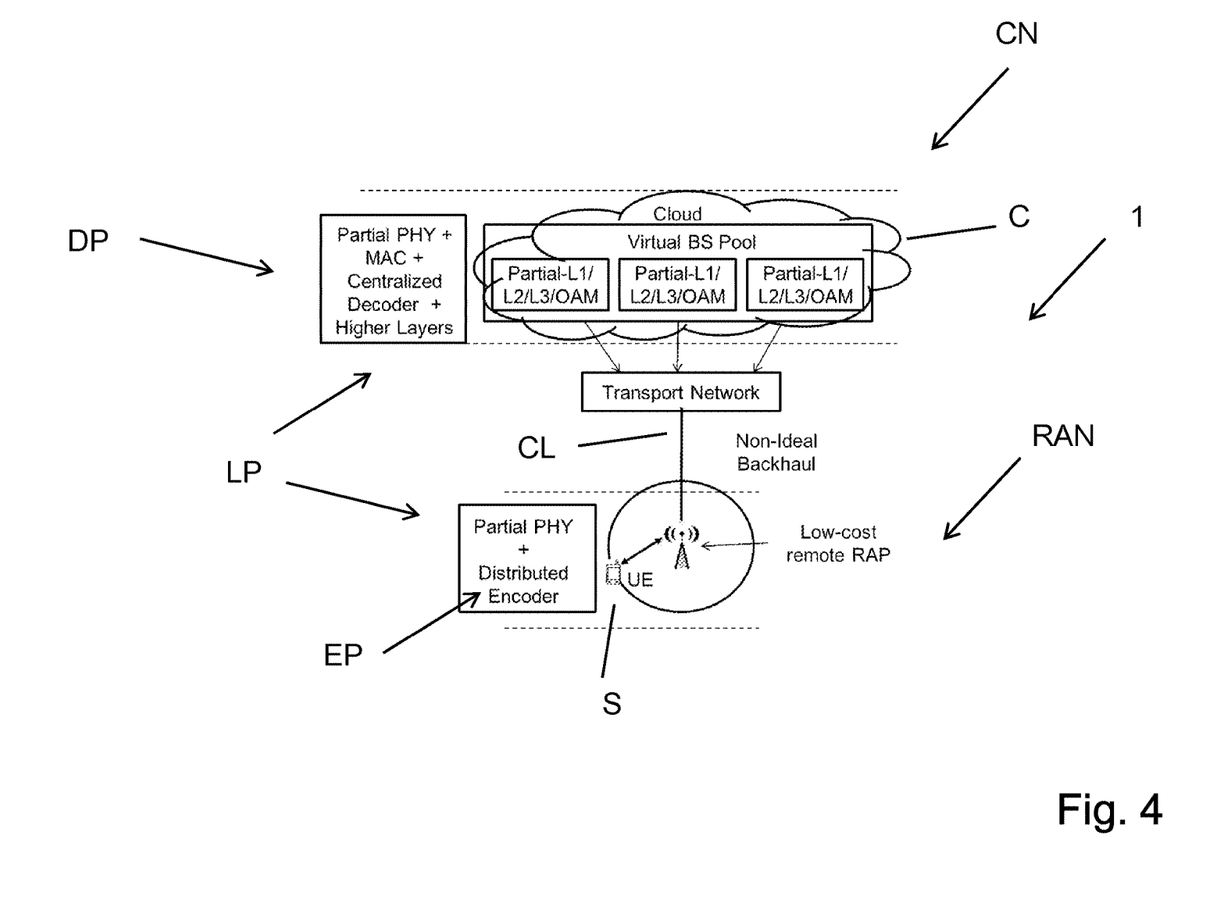
FIG. 4 shows part of a mobile communication network according to a second embodiment of the present invention.

FIG. 3 shows part of a mobile communication network according to a first embodiment of the present invention and FIG. 4 shows part of a mobile communication network according to a second embodiment of the present invention.

In FIG. 3, an uplink processing in a centralized architecture is shown whereas in FIG. 4 the corresponding downlink processing of said architecture is shown. Remote radio access points RAP only perform part of the RAN protocol stack while the main part is performed centrally in a virtualized base station pool located in a cloud. The connection between the different remote radio access point RAP is performed by a communication link CL of a transport network. The cloud C partially processes links in form of providing a partial physical layer, medium access control MAC, a centralized decoder and further higher layers, whereas the remote radio access point RAP performs further a layer 1 functionality plus a distributed encoder EP, for example as shown in FIG. 4. When a link process LP in form of a centralized decoder runs on the cloud C the decoding process DP might cause an increase of data transmission delay in the communication link CL between the user equipment UE and the core network CN of the mobile communication network 1. When the decoder causes the largest deterioration in delay, then the decoding process is identified and the link parameters of the identified decoding process DP are adapted depending on the latency requirements of a service S running on the user equipment UE and using said communication link CL.

Figure 5:
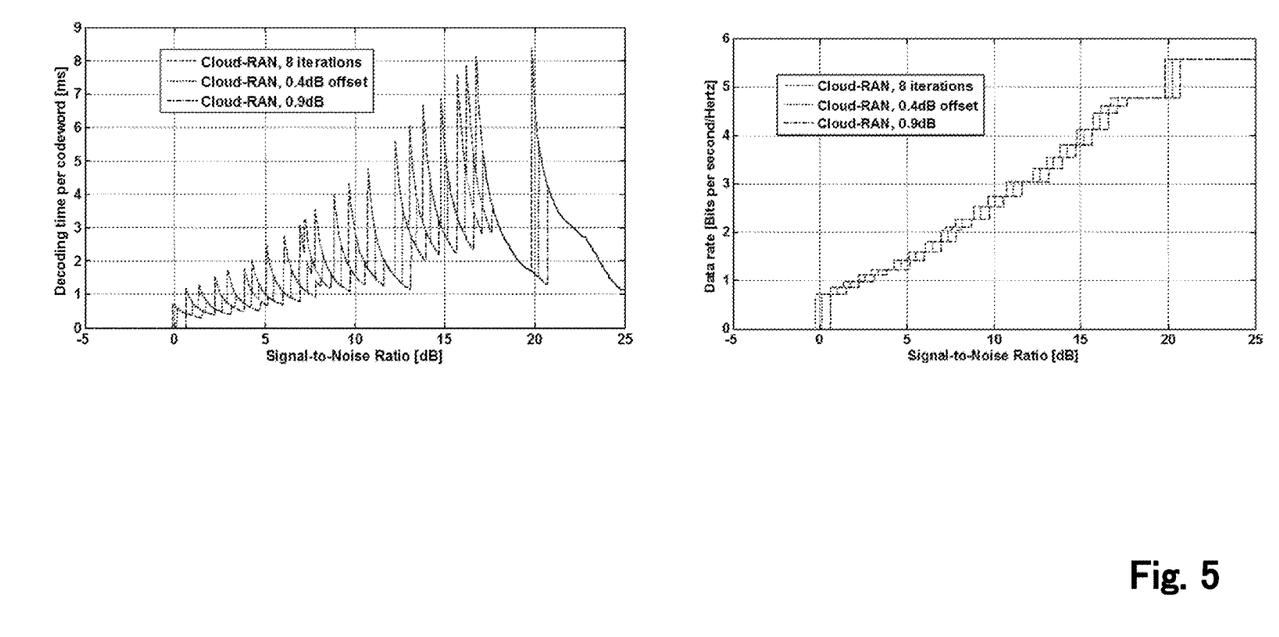
FIG. 5 shows a decoding time and data rate over signal-to-noise ratios for a mobile communication network according to a third embodiment of the present invention.

FIG. 5 shows a decoding time and data rate over signal-to-noise ratios for a mobile communication network according to a third embodiment of the present invention.

In FIG. 5, on the left side a decoding time per code word in milliseconds is shown over the corresponding signal-to-noise ratio in dB for a cloud radio access network with different offsets and for 8 iterations. The same is shown for the corresponding data rate in bits per second/Hertz over the corresponding signal-to-noise ratio in dB on the right side of FIG. 5.

In summary, embodiments of the present invention provide a method and a system proactively controlling preferably the processing latency of a radio access network by changing the chosen modulation-and-coding scheme, i.e. by modifying the link-adaptation process. In particular, the direct dependence of required decoding time and experienced signal-to-noise power ratio is exploited: The closer communication link operates to its channel capacity more processing resources in order to decode successfully are required. If the number of resources is either fixed or a parallelization of algorithms is not possible, etc. then the amount of time to process a code word also increases. In order to control the decoding latency either the signal-to-noise power ratio is changed for instance through higher transmission power or the actual modulation-and-coding scheme is reduced if the decoding time would exceed the decoding latency constraint.

Further, an embodiment of the present invention provides a mobile communication network respectively a system which Chooses the link-adaptation or modulation-and-coding scheme depending on the latency requirements imposed by a used service, Allocates additional physical resource blocks, if possible, in order to outweigh the rate-loss due to the adjustment of the modulation and coding scheme, Maintains a table which relates the chosen link-adaptation to both service requirement in terms of latency and SINR, i.e. the actual modification of the link-adaptation (e.g. signal-to-noise power ratio SNR offset or modulation and coding scheme) depends on the user's experienced instantaneous channel conditions (e.g. signal-to-interference-plus-noise ratio SINR), Takes into account the delay imposed by the backhaul connection between remote access point and central processor or entity, e.g. if the delay is significant compared to the required latency guarantees, then this delay is subtracted from the required latency constraint.

Provides a self-learning module which permanently monitors the actual decoding time in order to adjust the link-adaptation table accordingly, if necessary, Enables a characterization of the en- and/or decoding performance using a single parameter which represents the required en- and/or decoding time per iteration and information bit, Depending on the decoding time constraint and the given modulation and coding scheme, in the case of a turbo-decoder a maximum number of turbo-decoder iterations is provided in order to maintain the decoding time and to provide feedback in time, If user terminals choose a modulation-and-coding scheme, then decoding feedback may be exploited in order to control the decoding delay such that before decoding is performed already a NACK is sent in order to indicate that a lower modulation and coding scheme must be chosen, If user terminals choose a modulation-and-coding scheme, then the base station may provide a user terminal and service-dependent link-adaptation table to each user terminal, The above can equally applied in the downlink in order to control the decoding time and resources at the user terminal.

In particular the present invention enables the use of the link-adaptation process to control the decoding latency, enables performing the decoding latency adaption based on user terminals and actual services that are delivered and preferably uses a single parameter to characterize the decoding performance.

The present invention can be applied to any mobile communication network or system that processes radio access network information but it is preferably applied to such networks or systems deploying general purpose hardware such in the case of cloud-computing platforms.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for operating a mobile communication network, the method comprising:
a) identifying link processing jobs running on one or more entities in the mobile communication network which cause an increase of data transmission delay in a communication link between a radio access network and a core network of the mobile communication network, wherein the data transmission delay includes a packet delay caused by a decoding process and/or encoding process, wherein the decoding process and/or encoding process is a decoding process and/or encoding process of an applied forward error correction on the communication link;

b) selecting one or more of the identified link processing jobs based on the respective data transmission delays; and c) adapting link parameters of the selected link processing jobs of the communication link depending on latency requirements of a service using the communication link, wherein depending (i) on a decoding time constraint indicating a maximum allowable decoding time for a turbo-decoder and/or (ii) on an encoding time constraint indicating a maximum allowable encoding time for a turbo-encoder, and parameters of a modulation-and-coding scheme, a maximum number of iterations for the turbo-decoder and/or turbo-encoder is provided.

2. The method according to claim 1, wherein, in step c), the link parameters being adapted include a signal-to-noise-power ratio that is adapted by using a higher or lower transmission power of entities between which the communication link is established.

3. The method according to claim 1, wherein, in step c), the link parameters being adapted include parameters representing a modulation-and-coding scheme, the parameters of the modulation-and-coding scheme being adapted, whereby the scheme is: reduced based on an encoding and/or decoding time exceeding an encoding and/or decoding latency constraint, and increased based on the encoding and/or decoding time falling below the encoding and/or decoding latency constraint.

4. The method according to claim 3, wherein the adapting of the modulation-and-coding scheme includes allocating or freeing additional resources for the communication link based on availability.

5. The method according to claim 4, wherein the additional resources are in form of physical resource blocks.

6. The method according to claim 3, further comprising providing user terminal information and service-dependent link adaptation information to each user terminal based on user terminals choosing modulation-and-coding schemes.

7. The method according to claim 1, wherein the data transmission delay imposed by a backhaul connection between a remote access point in the radio access network and an entity in the core network is determined and included in the latency requirements of the service.

8. The method according to claim 1, wherein for representing a performance of the decoding and/or encoding process a single parameter is used.

9. The method according to claim 1, wherein feedback information of the decoding and/or encoding process is evaluated by comparing the feedback information with a decoding time constraint and/or encoding time constraint and providing a change indication for the modulation-and-coding scheme to a user terminal based on the constraint not being met.

10. The method according to claim 1, wherein a monitoring module is provided which is self-learnable, regularly or permanently monitors the selected link processing jobs, evaluates monitoring information and adjusts the link parameters of step c) automatically based on the evaluated monitoring information.

11. The method according to claim 10, wherein the link processing jobs are in form of a decoding and/or encoding process and the monitoring information is in form of actual decoding time and/or encoding time.

12. The method according to claim 1, wherein an entity on which the link processing jobs are running is provided in form of a base station and/or a user terminal in the radio access network.

13. The method according to claim 1, wherein relation information is maintained reflecting link parameters of the selected link processing jobs and service requirements.

14. The method according to claim 13, wherein the relation information is in form of a link adaptation table and the service requirements include latency requirements and signal-to-interference-plus-noise ratio of conditions of the communication link.

15. The method according to claim 1, wherein the data transmission delay is packet delay and the link processing jobs that are selected in step b) are the link processing jobs causing the largest deterioration in the packet delay.

16. A system for use in a mobile communication network including a radio access network and a core network, the system comprising one or more processors which, alone or in combination, provide for execution of a method comprising:

a) identifying link processing jobs running on one or more entities in the mobile communication network which cause an increase of data transmission delay in a communication link between a radio access network and a core network of the mobile communication network, wherein the data transmission delay includes a packet delay caused by a decoding process and/or encoding process, wherein the decoding process and/or encoding process is a decoding process and/or encoding process of an applied forward error correction on the communication link;

b) selecting one or more of the identified link processing jobs based on the respective data transmission delays; and c) adapting link parameters of the selected link processing jobs of the communication link depending on latency requirements of a service using the communication link, wherein depending (i) on a decoding time constraint indicating a maximum allowable decoding time for a turbo-decoder and/or (ii) on an encoding time constraint indicating a maximum allowable encoding time for a turbo-encoder, and parameters of a modulation-and-coding scheme, the one or more processors further provide a maximum number of iterations for the turbo-decoder and/or turbo-encoder.

17. The system according to claim 16, wherein the system is configured to select the link processing jobs causing the largest deterioration in the packet delay.

18. A method for operating a mobile communication network, the method comprising:

a) identifying link processing jobs running on one or more entities in the mobile communication network which cause an increase of data transmission delay in a communication link between a radio access network and a core network of the mobile communication network, wherein the data transmission delay includes a packet delay caused by a decoding process and/or encoding process;

b) selecting one or more of the identified link processing jobs based on the respective data transmission delays;

c) adapting link parameters of the selected link processing jobs of the communication link depending on latency requirements of a service using the communication link, wherein the link parameters being adapted include parameters representing a modulation-and-coding scheme, the parameters of the modulation-and-coding scheme being adapted, whereby the scheme is: reduced based on an encoding and/or decoding time exceeding an encoding and/or decoding latency constraint, and increased based on the encoding and/or decoding time falling below the encoding and/or decoding latency constraint; and d) providing user terminal information and service-dependent link adaptation information to each user terminal based on user terminals choosing modulation-and-coding schemes.

19. A method for operating a mobile communication network, the method comprising:

a) identifying link processing jobs running on one or more entities in the mobile communication network which cause an increase of data transmission delay in a communication link between a radio access network and a core network of the mobile communication network, wherein the data transmission delay includes a packet delay caused by a decoding process and/or encoding process;

b) selecting one or more of the identified link processing jobs based on the respective data transmission delays; and c) adapting link parameters of the selected link processing jobs of the communication link depending on latency requirements of a service using the communication link, wherein the link parameters being adapted include parameters representing a modulation-and-coding scheme, the parameters of the modulation-and-coding scheme being adapted, whereby the scheme is: reduced based on an encoding and/or decoding time exceeding an encoding and/or decoding latency constraint, and increased based on the encoding and/or decoding time falling below the encoding and/or decoding latency constraint, and wherein the adapting of the modulation-and-coding scheme includes allocating or freeing additional resources for the communication link based on availability, and wherein the additional resources are in form of physical resource blocks.

20. A method for operating a mobile communication network, the method comprising:

a) identifying link processing jobs running on one or more entities in the mobile communication network which cause an increase of data transmission delay in a communication link between a radio access network and a core network of the mobile communication network, wherein the data transmission delay includes a packet delay caused by a decoding process and/or encoding process;

b) selecting one or more of the identified link processing jobs based on the respective data transmission delays; and c) adapting link parameters of the selected link processing jobs of the communication link depending on latency requirements of a service using the communication link, wherein a monitoring module is provided which is self-learnable, regularly or permanently monitors the selected link processing jobs, evaluates monitoring information and adjusts the link parameters of step c) automatically based on the evaluated monitoring information, and wherein the link processing jobs are in form of a decoding and/or encoding process and the monitoring information is in form of actual decoding time and/or encoding time.

21. A method for operating a mobile communication network, the method comprising:

a) identifying link processing jobs running on one or more entities in the mobile communication network which cause an increase of data transmission delay in a communication link between a radio access network and a core network of the mobile communication network, wherein the data transmission delay includes a packet delay caused by a decoding process and/or encoding process;

b) selecting one or more of the identified link processing jobs based on the respective data transmission delays; and c) adapting link parameters of the selected link processing jobs of the communication link depending on latency requirements of a service using the communication link, wherein relation information is maintained reflecting link parameters of the selected link processing jobs and service requirements, and wherein the relation information is in form of a link adaptation table and the service requirements include latency requirements and signal-to-interference-plus-noise ratio of conditions of the communication link.

* * * * *